(12) United States Patent
Fitz

(10) Patent No.: US 11,415,195 B2
(45) Date of Patent: Aug. 16, 2022

(54) SYSTEM CONSISTING OF STATICALLY LOADABLE COMPONENTS IN A STRUCTURE

(71) Applicant: Pfeifer Holding GmbH & Co. KG, Memmingen (DE)

(72) Inventor: Christian Fitz, Bad Waldsee (DE)

(73) Assignee: Pfeifer Holding GmbH & Co. KG, Memmingen (DE)

( * ) Notice: Subject to any disclaimer, the term of this patent is extended or adjusted under 35 U.S.C. 154(b) by 0 days.

(21) Appl. No.: 16/639,392

(22) PCT Filed: Aug. 10, 2018

(86) PCT No.: PCT/EP2018/071757
§ 371 (c)(1),
(2) Date: Feb. 14, 2020

(87) PCT Pub. No.: WO2019/034555
PCT Pub. Date: Feb. 21, 2019

(65) Prior Publication Data
US 2020/0256425 A1 Aug. 13, 2020

(30) Foreign Application Priority Data
Aug. 16, 2017 (DE) ...................... 20 2017 104 917.5

(51) Int. Cl.
*F16G 11/12* (2006.01)
*E04C 5/08* (2006.01)
(Continued)

(52) U.S. Cl.
CPC ............... *F16G 11/12* (2013.01); *E04C 5/08* (2013.01); *F16G 11/025* (2013.01); *F16G 11/146* (2013.01)

(58) Field of Classification Search
CPC ........ F16G 11/12; F16G 11/02; F16G 11/025; F16G 11/146; E04C 5/08
See application file for complete search history.

(56) References Cited

U.S. PATENT DOCUMENTS

| | | | | |
|---|---|---|---|---|
| 427,302 A | * | 5/1890 | Dumas | .................... F16G 11/04 403/275 |
| 1,366,732 A | * | 1/1921 | Hoyt | ....................... F16G 11/12 403/44 |

(Continued)

FOREIGN PATENT DOCUMENTS

| | | |
|---|---|---|
| CH | 700568 A2 | 9/2010 |
| CN | 2392033 Y | 8/2000 |

(Continued)

OTHER PUBLICATIONS

International Search Report and Written Opinion for International Application No. PCT/EP2018/071757, dated Nov. 27, 2018.

(Continued)

*Primary Examiner* — Robert Sandy
*Assistant Examiner* — Louis A Mercado
(74) *Attorney, Agent, or Firm* — Wolf, Greenfield & Sacks, P.C.

(57) ABSTRACT

The present application relates to a system consisting of statically loadable components for structures, including at least two different tension elements (10, 14), each with at least one end region (11, 15), which have an outer thread (12, 16) in their end region (11, 15), and at least one connection component (20, 20', 30) with an inner thread (22) which is configured to interact with the outer thread (12, 16) of one of the tension elements (10, 14) as a tension member. According to the invention, the outer threads (12, 16) of the at least two different tension elements (10, 14) have the same thread load capacity and determine a respective threshold (Continued)

tensile force of the at least two different tension elements (10, 14).

17 Claims, 2 Drawing Sheets

(51) Int. Cl.
*F16G 11/02* (2006.01)
*F16G 11/14* (2006.01)

(56) References Cited

U.S. PATENT DOCUMENTS

| | | | | |
|---|---|---|---|---|
| 1,828,287 A * | 10/1931 | Thomas | ............... | B22D 19/04 |
| | | | | 470/11 |
| 1,877,370 A * | 9/1932 | Albert | ............... | F16G 11/12 |
| | | | | 72/370.13 |
| 2,016,856 A * | 10/1935 | Fiege | ............... | F16G 11/05 |
| | | | | 403/185 |
| 2,412,948 A * | 12/1946 | Brickman | ............... | H01R 11/11 |
| | | | | 403/376 |
| 2,446,542 A * | 8/1948 | MacInnes | ............... | H01R 4/62 |
| | | | | 174/94 R |
| 3,573,346 A * | 4/1971 | Appleby | ............... | F16G 11/042 |
| | | | | 174/71 R |
| 4,365,906 A * | 12/1982 | King | ............... | B63H 9/10 |
| | | | | 403/157 |
| 5,000,611 A | 3/1991 | Reinhart | | |
| 5,351,366 A * | 10/1994 | Shaw | ............... | F16G 11/05 |
| | | | | 24/122.6 |
| 8,091,317 B2 * | 1/2012 | Brackett | ............... | E04C 5/0645 |
| | | | | 52/742.14 |
| 8,961,061 B2 * | 2/2015 | Wahlberg | ............... | F16G 11/025 |
| | | | | 403/275 |
| 10,495,180 B2 | 12/2019 | Weirich | | |
| 2008/0282511 A1 * | 11/2008 | Chou | ............... | F16G 11/025 |
| | | | | 24/135 R |
| 2019/0128375 A1 * | 5/2019 | Benavidez | ............... | F16G 11/14 |

FOREIGN PATENT DOCUMENTS

| | | |
|---|---|---|
| CN | 204592145 U | 8/2015 |
| DE | 32 20 984 A1 | 7/1983 |
| DE | 93 00 199 U1 | 5/1993 |
| DE | 298 11 002 U1 | 9/1998 |
| DE | 102 16 918 A1 | 11/2003 |
| DE | 102 16 918 B4 | 8/2004 |
| DE | 10 2007 001 830 A1 | 7/2008 |
| DE | 10 2013 100 732 A1 | 7/2014 |
| EP | 0 619 443 A1 | 10/1994 |
| EP | 0 945 648 A1 | 9/1999 |
| KR | 10-2012-0006243 A | 1/2012 |
| KR | 101128422 B1 | 3/2012 |
| WO | WO 03/072961 A1 | 9/2003 |

OTHER PUBLICATIONS

Chinese Office Action dated Apr. 2, 2021 in connection with Chinese Application No. 201880053272.4, and English translation thereof.

* cited by examiner

SYSTEM CONSISTING OF STATICALLY LOADABLE COMPONENTS IN A STRUCTURE

CROSS-REFERENCE TO RELATED APPLICATIONS

This application is a national stage filing under 35 U.S.C. § 371 of international application no. PCT/EP2018/071757, filed Aug. 10, 2018, which claims priority to German application no. 20 2017 104 917.5, filed Aug. 16, 2017, each of which is herein incorporated by reference in its entirety.

TECHNICAL FIELD

The present invention relates to a system consisting of statically loadable components for structures, comprising at least two different, replaceable tension elements, each with at least one end region, which have an outer thread in their end region. The system further comprises at least one connection component with an inner thread which is configured to interact with the outer thread of one of the tension elements as a tension member.

Definitions

In the context of the present application, the following definitions are to be taken as a basis:

Tension member: A tension member is a tension element which is equipped with at least one connection component.

Tension element: A tension element can be a tension rod or a cable tension member.

Tension rod: A tension rod can comprise any full cross section with a rolled or machined outer thread at one end region at least.

Cable tension member: A cable tension member can consist of a cable and a pressed or rolled cable end connection, in particular a thread fitting.

Connection component: A connection component can be a connector head or a sleeve.

Connector head: A connector head can be a fork head or a rod end. It is suitable for connecting tension elements with each other or with a surrounding structure. Together with a tension element, it forms a tension member.

Fork head: A fork head can be a cast part, forged part or mechanically manufactured part with an inner thread and two lugs with eyes.

Rod end: A rod end can be a cast part, forged part or mechanically manufactured part with an inner thread and a lug with an eye.

Thread fitting: A thread fitting can consist of a press socket and an outer thread region. A thread fitting is suitable for being rolled or pressed onto a cable.

Cable: A cable can consist of round wires and/or profile wires which are stranded at least once.

Sleeve: A sleeve can be a connection element with two equally or unequally directed inner threads. It is suitable for connecting tension elements with each other or with a surrounding structure.

PRIOR ART

In known systems consisting of statically loadable components for structures, tension rods and cable tension members are often used. Tension rods usually comprise full cross sections having a thread at their two ends, via which various connection components with an inner thread can be connected with the rod. Examples of such connection components are fork heads, rod ends or sleeves, which are used, for example, to connect the rod with another rod or with the structure.

In order to be able to connect a connection component with a cable tension member, end fittings, in particular thread fittings, are usually pressed. Thread fittings usually consist of a press socket and an outer thread region, inter alia. The outer thread region of the thread fitting, like the thread of a tension rod, can be connected with a connection component with an inner thread.

Due to different safety concepts and safety factors for cable tension members and tension rods, it has been common practice to date to provide proof of the pressing of the cable end connection, in particular the thread fitting, in cable tension members. For the tests required to provide proof, it is necessary that the thread of the thread fitting can accommodate a load greater than the calculated breaking force of the cable. Otherwise, the maximal load which can be accommodated by pressing of the thread fitting cannot be determined by tensile tests since the thread would fail in advance. As a consequence of this approach, it had to be the target of every design of a cable tension member to design a cable tension member which does not fail in the region of the end connection, but in the region of the cable.

Due to the different test procedures for the load-carrying capacity of tension rods and cable tension members, the threshold tensile forces and the breaking forces of tension rods and cable tension members with the same thread size of the connections differ considerably, which at least severely limits a flexible change between cable tension members and tension rods.

DESCRIPTION OF THE INVENTION

Against this background, it is an object of the present invention to provide a system in which it is possible to easily switch back and forth between different tension elements, in particular between tension rods on the one hand and cable tension members on the other hand.

The object of the present invention is solved by a system according to claim 1 as well as a tension element according to claim 14 and a connection component according to claim 15.

The system consisting of statically loadable components in a structure, as according to the invention, comprises at least two different, replaceable tension elements, each with at least one end region, which have an outer thread in their end region. The system further comprises at least one connection component with an inner thread which is configured to interact with the outer thread of the tension element. According to the invention, the outer threads of the at least two different, replaceable tension elements have the same thread load capacity and determine a respective threshold tensile force of the at least two different, replaceable tension elements.

Test series have shown that the breaking force of the cable does not have to be decisive for the load capacity of a cable tension member. As is the case with the tension rod, the thread load capacity can also be assumed to be decisive with a cable tension member. In this case, the cable diameter and, optionally, the pressing of the thread fitting can be adjusted to the thread load capacity such that the thread has the smallest load-carrying capacity and thus the different tension elements, in particular the cable tension member and the tension rod, have the same threshold tensile force determined by the thread when taking the respectively valid safety concepts into account.

In this way, different tension elements can be equipped with the same connection component and provide the same threshold tensile force. This allows a replacement of different tension elements without the previously required considerable (re)construction effort, for example due to different dimensions of the different connection components or the different breaking or threshold tensile forces of different tension elements.

In other words, it is provided according to the invention that the weakest member, i.e. the thread in the case of the tension rod, is harmonized for all tension elements of the system. Thus, the different tension elements can easily be replaced and used as modules, and the system can be used much more efficiently.

A specific connection component can be used with the different tension elements, which makes the system highly flexible since any combinations are possible, which were either not possible before or each of which at least had to be checked or tested with regard to a specific intended use.

In a preferred embodiment, the tension elements have a tension rod or a cable. Other elements such as compression rods or similar components are also basically conceivable as tension members, with the invention showing its advantage particularly in systems in which either a tension rod or a cable can be used in principle.

In particular, the tension element can be a tension rod or a compression rod with a thread, as described in the parallel utility model application of the present Applicant, which was filed on the same day as the present application under the title "Tension Member or Compression Member Having Corrosion-Resistant Thread Flanks". The content of the parallel utility model application in this regard is herewith also explicitly made the subject matter of the present application.

A fork head is preferred as the connection component. However, there are also rod ends, inter alia, in particular for connecting the tension members with each other and with the surrounding construction. In addition to a fork head and a rod end, however, other connection components are also conceivable which can be attached to the different tension elements in order to be able to connect the tension member in question with another object and which are provided with an inner thread for interacting with the outer thread of the tension element.

In a preferred embodiment, the connection component has at least one lug with a length in a tension direction of the connection component, a width transverse to the tension direction and a thickness perpendicular to the length and width, through which an eye is formed along the direction of the thickness through the lug. An amount of the thickness of the lug in a center, based on the direction of the width, is maximal and decreases towards at least one side region lying outside in the direction of the width. More preferably, the amount of the thickness decreases towards two side regions lying outside and opposite each other in the direction of the width.

Due to this configuration of the connection component, it can be manufactured particularly well. In particular, it can be removed from the mold more easily during demolding in order to manufacture the connection component. Moreover, there are advantages when casting the connection component for the cores and also the part as such, which lie in particular in an easier manufacturing and better fluid-dynamic properties of the corresponding molds and cores.

The amount of the thickness preferably increases from the center to the side regions or decreases from the side regions such that an inclined plane is formed or two inclined planes are formed, which extends or extend from the respective side region to the center. More preferably, the amount of the thickness decreases from the center to the two side regions such that a high ridge is formed in the center.

The aforementioned advantages of this preferred embodiment are achieved thereby to a particular extent.

Preferably, the amount of the thickness can also vary in the direction of the tension direction, i.e. the direction of its length, irrespective of its preferred differences between the center and the side regions.

Preferably, the eye in the center, based on the direction of the width, is formed in the lug.

In particular the region of the eye becomes more loadable since there is a little more material in the region of abutting of a bolt or a similar element interacting with the eye than in other regions of the lug. In this way, a good compromise can be achieved between a low weight on the one hand and high strength on the other hand. Thus, the eye rod behind the bolt also finds a little more material, which makes it easier to provide proof of the strength of the overall system. Moreover, this preferred embodiment leads to a higher bending resistance of the lug, which is important in particular in the case of a usually undesired but not excludable transverse load.

Alternatively, the amount of the thickness of the lug in the direction of the width can be essentially constant.

In a preferred embodiment, the connection component has two equally configured lugs, the eyes of which are formed in alignment with each other for accommodating a bolt. Thus, a particularly advantageous fork head can be formed.

In a further preferred embodiment, at least one, preferably two, of the at least two different, replaceable tension elements each have an outer thread in both end regions. The inner thread of the at least one connection component is then configured to interact with the respective outer thread of both end regions. Alternatively, embodiments are also possible in which at least one of the at least two different, replaceable tension elements has a fitting outer thread at only one of its two end regions.

In a preferred embodiment, one of the at least two different, replaceable tension elements is a tension rod, the outer thread of which is formed by machining or by demolding, i.e. cold forming. An outer thread formed by demolding, i.e. cold forming, is advantageous since it has a higher strength than a thread manufactured by machining. However, processing by machining in order to form the thread is also possible.

In a further preferred embodiment, one of the at least two different, replaceable tension elements is a cable tension member, the outer thread of which is formed at a thread fitting.

Alternatively to a thread fitting, casting processes or other forms are also conceivable in order to provide the cable tension member with an outer thread.

Preferably, the outer thread can accommodate a load smaller than the calculated breaking force of the respective tension element, or the outer thread can accommodate a load equal to the calculated breaking force of the respective tension element. This configuration of the tension element and its outer thread ensures that with the same thread size of the different tension elements a flexible change between the different tension elements is possible without making a new calculation or any other adaptation of the overall system necessary. The reason for this is that this preferred configuration always ensures that the tension rod or the cable or the pressing of a thread fitting before the outer thread do not fail, so that the selection of the tension element, in particular a tension rod or a cable tension member, can be made freely since the breaking force of the respective tension element is sufficient in any case.

Preferably, the connection component and/or the tension element are formed of stainless steel or galvanized or coated steel. Stainless steel and galvanized or coated steel have proven to be particularly advantageous in the field of tension members and connection components, in particular when used in a structure, since they can accommodate relatively high loads and are easily machinable and corrosion-resistant. However, other materials can also be used for the connection components, the tension element or both.

In a preferred embodiment, the connection component can optionally be combined with any of the at least two different, replaceable tension elements. It is therefore possible in this preferred embodiment to combine the same connection components with any of the available tension elements of the system without an additional adapter or a similar element, in particular also if the system comprises more than two different tension elements for a specific construction.

A tension element for the system described above, as according to the invention, comprises at least one end region in which it has an outer thread and is configured to interact with an inner thread of a connection component of the system.

Further features and advantages of the invention are apparent from the entirety of the claims and the following description of the figures.

WAYS OF IMPLEMENTING THE INVENTION

Figure 1:
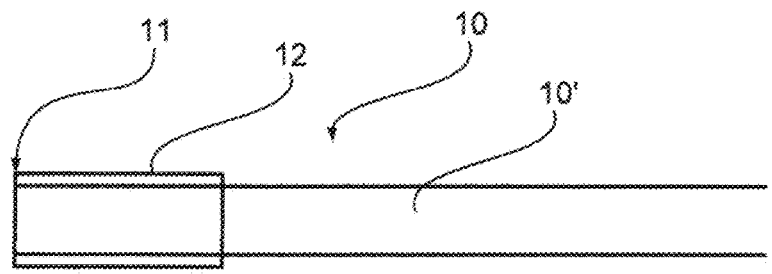
FIG. 1 shows a tension rod with a rolled thread.

FIG. 1 shows a tension rod 10 comprising a full cross section 10' with a rolled thread. The tension rod 10 is a first example of a tension element of a system consisting of statically loadable components in a structure and has an end region 11 in which an outer thread 12 is formed. In the embodiment shown in FIG. 1, the outer thread 12 is configured as a rolled thread and extends over the end region 11 of a defined length on the one side of the tension rod 10. The second side of the tension rod 10 is not shown in FIG. 1 and can also be provided with an outer thread in its end region. However, it is also possible that the tension rod 10 is formed without such an outer thread 12 on its side not shown.

Figure 2:
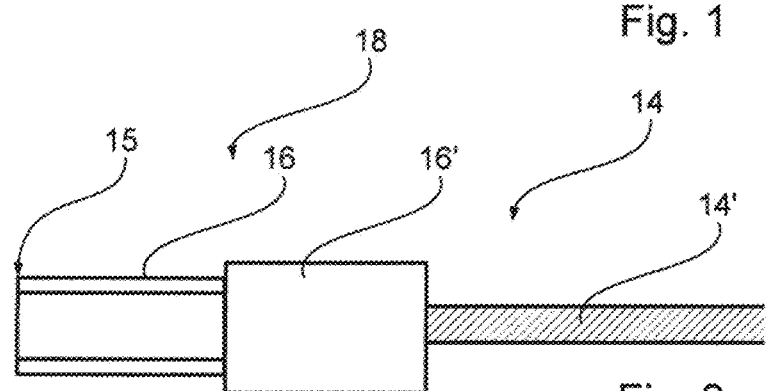
FIG. 2 shows a cable tension member with a thread fitting.

FIG. 2 shows a cable tension member 14 with a thread fitting 18 and thus a second example of a tension member of a system consisting of statically loadable components in a structure. The cable tension member 14 has an end region 15 at which the thread fitting 18 is arranged. The thread fitting 18 is pressed onto a cable 14' by means of a press socket 16' and has, in addition to the press socket 16', an outer thread region with an outer thread 16. The outer thread 16 of the cable tension member 14 from FIG. 2 corresponds to the outer thread 12 of the tension rod 10 from FIG. 1.

Figure 3A:
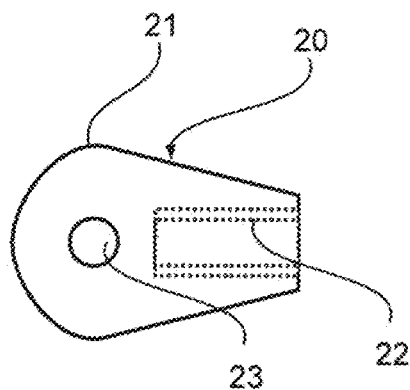
FIGS. 3a and 3b show a fork head with an inner thread.
Figure 3B:
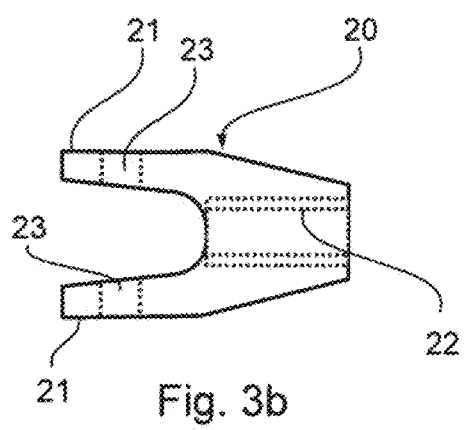

FIGS. 3a and 3b show a fork head 20 as an example of a connection component of a system consisting of statically loadable components in a structure, with the fork head 20 having an inner thread 22 and an eye 23. The inner thread 22 of the fork head 20 is configured such that it can interact with the outer threads 12, 16 of the tension rod 10 and the cable tension member 14. FIG. 3a shows a side view of the fork head 20, whereas FIG. 3b shows a top view of the fork head 20.

Figure 3C:
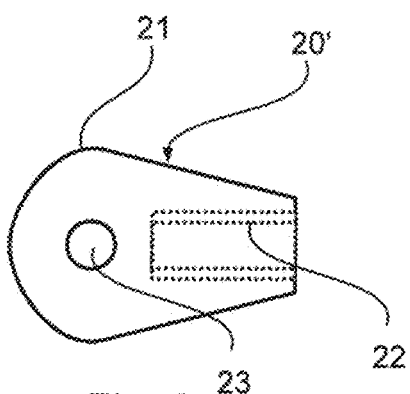
FIGS. 3c and 3d show a rod end with an inner thread.
Figure 3D:
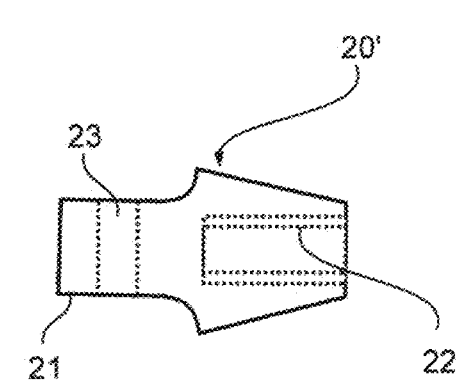

FIGS. 3c and 3d show a rod end 20' as a further example of a connection component of a system consisting of statically loadable components in a structure, with the rod end 20' having an inner thread 22 and an eye 23, which can be formed as in the fork head 20 from FIGS. 3a and 3b. FIG. 3c shows a side view of the rod end 20', whereas FIG. 3d shows a top view of the rod end 20'. In contrast to the fork head 20, the rod end 20' has only one lug 21, not two lugs 21, as is apparent when comparing the two top views 3b and 3d.

Figure 4:
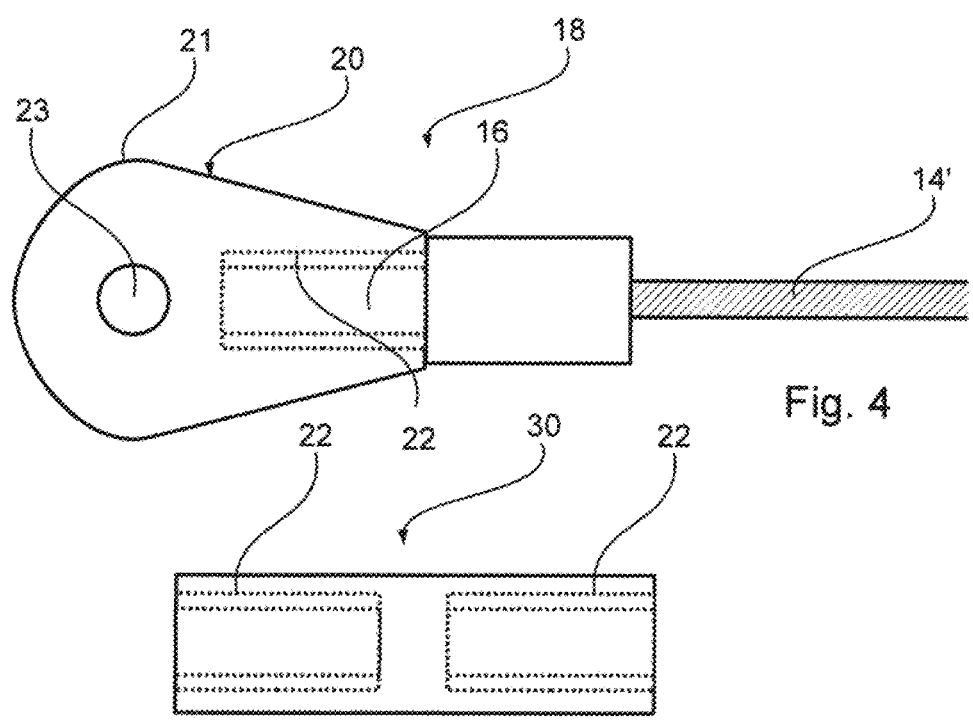
FIG. 4 shows a two-part fork fitting.

FIG. 4 now shows an example of a two-part fork fitting, in which the fork head 20 with an inner thread 22 from FIGS. 3a and 3b was screwed onto the cable tension member 14 with a thread fitting 18 from FIG. 2. The inner thread 22 interacts with the outer thread 16. The fork head 20 could just as well be connected with the tension rod 10 from FIG. 1 in order to form a two-part fork fitting consisting of the fork head 20 with an inner thread 22 and the tension rod 10 with an outer thread 12. Of course, a rod end and a cable tension member or a tension rod can also be used analogously in order to form a two-part rod end fitting.

In the embodiment shown, the fork head 20 can be connected with either the cable tension member 14 or the tension rod 10 so that it is possible, even at the last second before the installation or even after the installation, to replace the cable tension member 14 with a corresponding tension rod 10 or vice versa without carrying out a new statistical calculation or having to adapt other components of the overall structure.

Figure 5:
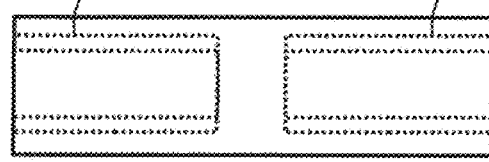
FIG. 5 shows a sleeve with inner threads.

While in FIGS. 3a to 3d and 4 connector heads are shown as examples of a connection component, FIG. 5 shows a sleeve 30 as a further example of a connection component.

Figure 6A:
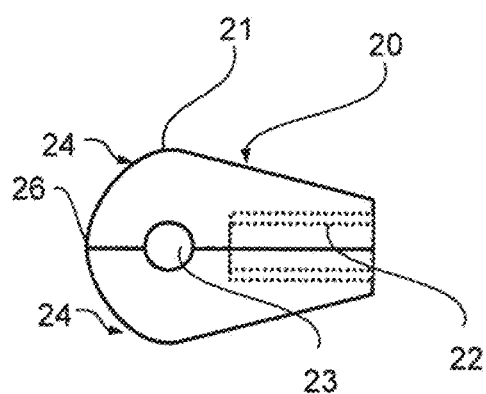
FIGS. 6a and 6b show a further embodiment of a fork head with an inner thread.
Figure 6B:
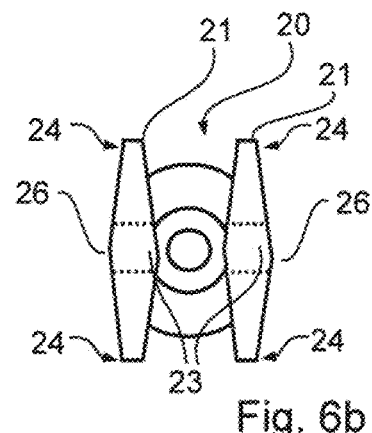

FIGS. 6a and 6b show a further embodiment of a fork head 20 with an inner thread 22. While FIG. 6a shows a side view of the fork head 20, FIG. 6b shows a front view of the fork head 20. The fork head 20 corresponds essentially to the fork head 20 shown in FIGS. 3a and 3b. Like the fork head 20 from FIGS. 3a and 3b, the fork head 20 shown in FIGS. 6a and 6b has two lugs 21 with a length in a tension direction, a width transverse to the tension direction and a thickness perpendicular to the length and width, through each of which a respective eye 23 is formed along the direction of the thickness through the lugs 21.

In contrast to the embodiment from FIGS. 3a and 3b, in the embodiment from FIGS. 6a and 6b an amount of the thickness of the lug 21 in a center, based on the direction of the width, is maximal and decreases towards two side regions 24 lying outside and opposite each other in the direction of the width. Thus, a high ridge 26 is formed in the center.

Figure 6C:
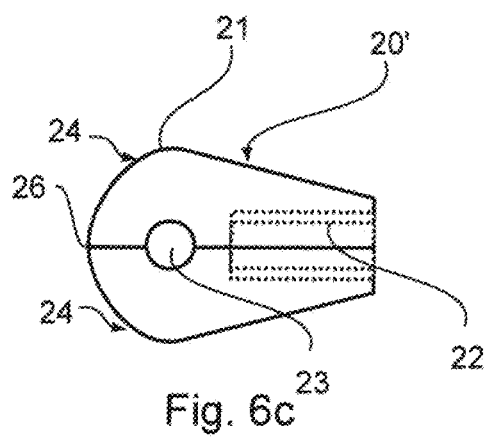
FIGS. 6c and 6d show a further embodiment of a rod end with an inner thread.
Figure 6D:
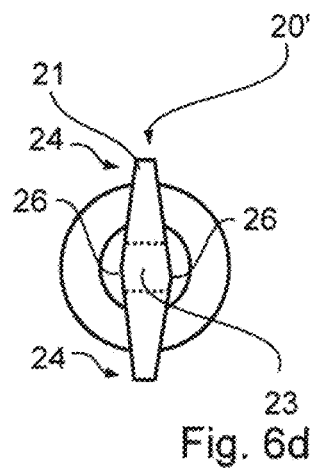

FIGS. 6c and 6d show a further embodiment of a rod end 20' with an inner thread 22. While FIG. 6c shows a side view of the rod end 20', FIG. 6d shows a front view of the rod end 20'. The difference between the embodiment according to FIGS. 6c and 6d as compared to FIGS. 3c and 3d in turn lies in that an amount of the thickness of the lug 21 in a center, based on the direction of the width, is maximal and decreases towards two side regions 24 lying outside and opposite each other in the direction of the width. Thus, a high ridge 26 is formed in the center.

Thus, the system according to the invention, in particular according to the preferred embodiments from FIGS. 1 to 6*d*, makes it possible to randomly use different combinations of different tension elements and connection components while the loads of the overall system remain the same.

The invention claimed is:

1. A system of statically loadable components for structures, the system comprising:
   a first tension element including a first end region having an outer thread,
   a second tension element including a first end region having an outer thread, the second tension element being different and physically separate from the first tension element, and
   at least one connection component with an inner thread which is configured to interact with the outer thread of each one of the first and second tension elements to form a tension member,
   the outer threads of the first and second tension elements configured to have a maximum thread load capacity, the outer threads having the same maximum thread load capacity, the thread load capacity of the outer threads establishing a maximum tensile force capacity of each of the first and second tension elements,
   wherein one of the first and second tension elements is a tension rod and wherein the outer thread of the tension rod is a cold-formed thread.

2. The system according to claim 1, wherein the first and second tension elements include at least one tension rod and at least one cable tension member.

3. The system according to claim 1, wherein the connection component is a fork head or a rod end or a sleeve.

4. The system according to claim 3, wherein the connection component is configured to connect the first and second tension elements with each other or to anchor an end of one of the first and second tension elements to a structure.

5. The system according to claim 1, wherein the connection component has at least one lug with a length in a tension direction of the connection component, a width in a direction transverse to the tension direction and a thickness in a direction perpendicular to the length and the width, through which an eye formed along the direction of the thickness through the lug,
   wherein an amount of the thickness of the lug in a center, based on the direction of the width, is maximal and decreases towards at least one side region lying outside in the direction of the width.

6. The system according to claim 5, wherein the eye in the center, based on the direction of the width, is formed in the lug.

7. The system according to claim 5, wherein the connection component has two equally configured lugs, the eye of each of the lungs being aligned with each other for accommodating a bolt so as to form a fork head.

8. The system according to claim 5, wherein the amount of the thickness of the lug in the center decreases towards two side regions lying outside and opposite each other in the direction of the width.

9. The system according to claim 8, wherein the amount of the thickness decreases from the center to the two side regions such that a high ridge is formed in the center.

10. The system according to claim 1, wherein the connection component has at least one lug with a length in a tension direction of the connection component, a width in a direction transverse to the tension direction and a thickness in a direction perpendicular to the length and the width, through which an eye is formed along the direction of the thickness through the lug,
    wherein an amount of the thickness of the lug in the direction of the width is constant.

11. The system according to claim 10, wherein the connection component has two equally configured lugs, the eye of each of the lungs being formed in alignment with each other for accommodating a bolt so as to form a fork head.

12. The system according to claim 1, wherein each of the first and second tension elements includes a second end region having an outer thread and wherein the inner thread of the at least one connection component is configured to interact with the outer thread of the respective first and second end regions.

13. The system according to claim 1, wherein one of the first and second tension elements is a cable tension member and wherein the outer thread is formed at a thread fitting.

14. The system according to claim 1, wherein the outer thread is configured to accommodate a load smaller than or equal to a calculated breaking force for other portions of the respective tension element.

15. The system according to claim 1, wherein the connection component and/or the first and second tension elements is/are formed of stainless steel or galvanized steel or coated steel.

16. The system according to claim 1, wherein the connection component is configured to be combined with any of the first and second tension elements.

17. The system according to claim 1, wherein the first and second tension elements include a tension element with a cable and a tension element with a tension rod, each of the first and second tension elements is configured to have a threshold tensile force capacity, the threshold tensile force capacity of the first tension element being the same as the threshold tensile force capacity of the second tension element.

* * * * *

UNITED STATES PATENT AND TRADEMARK OFFICE
CERTIFICATE OF CORRECTION

PATENT NO. : 11,415,195 B2
APPLICATION NO. : 16/639392
DATED : August 16, 2022
INVENTOR(S) : Christian Fitz It is certified that error appears in the above-identified patent and that said Letters Patent is hereby corrected as shown below:

In the Claims

In Claim 7, Column 8, Line 3, replace "lungs" with -- lugs --.

In Claim 11, Column 8, Line 24, replace "lungs" with -- lugs --.

Signed and Sealed this
Twentieth Day of September, 2022

*Katherine Kelly Vidal*
Katherine Kelly Vidal
*Director of the United States Patent and Trademark Office*